United States Patent
Eshwar

(10) Patent No.: US 8,054,764 B2
(45) Date of Patent: Nov. 8, 2011

(54) TRANSMITTING CRITICAL TABLE INFORMATION IN DATABASES

(75) Inventor: Bhavani Kumar Eshwar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 12/478,471

(22) Filed: Jun. 4, 2009

(65) Prior Publication Data

US 2010/0309911 A1 Dec. 9, 2010

(51) Int. Cl.
*H04L 12/28* (2006.01)

(52) U.S. Cl. ......... 370/254; 370/255; 370/312; 370/390

(58) Field of Classification Search .................. None
See application file for complete search history.

(56) References Cited

U.S. PATENT DOCUMENTS

| | | | |
|---|---|---|---|
| 5,471,629 A | 11/1995 | Risch | |
| 6,122,633 A * | 9/2000 | Leymann et al. | 1/1 |
| 6,292,803 B1 | 9/2001 | Richardson et al. | |
| 6,353,596 B1 * | 3/2002 | Grossglauser et al. | 370/256 |
| 6,567,809 B2 | 5/2003 | Santosuosso | |
| 6,618,373 B1 * | 9/2003 | Subramaniam | 370/390 |
| 6,631,420 B1 * | 10/2003 | Li et al. | 709/242 |
| 6,718,361 B1 * | 4/2004 | Basani et al. | 709/201 |
| 6,961,728 B2 | 11/2005 | Wynblatt et al. | |
| 7,054,862 B2 * | 5/2006 | Wilmot et al. | 1/1 |
| 7,075,904 B1 | 7/2006 | Manish et al. | |
| 7,277,915 B2 * | 10/2007 | de Boor et al. | 709/203 |
| 7,318,066 B2 * | 1/2008 | Kaufman et al. | 1/1 |
| 7,529,820 B2 * | 5/2009 | Eatough et al. | 709/223 |
| 7,609,694 B2 * | 10/2009 | Moki et al. | 370/390 |
| 7,693,185 B1 * | 4/2010 | Brown et al. | 370/474 |
| 2003/0172368 A1 * | 9/2003 | Alumbaugh et al. | 717/106 |
| 2004/0267712 A1 | 12/2004 | Papanyan et al. | |
| 2006/0239289 A1 * | 10/2006 | Zheng et al. | 370/432 |
| 2006/0271514 A1 * | 11/2006 | Chang et al. | 707/3 |
| 2007/0101344 A1 | 5/2007 | Srivastava | |
| 2010/0177642 A1 * | 7/2010 | Sebastian et al. | 370/248 |

OTHER PUBLICATIONS

Sharma, Punneet and Srinivas, Shettigar; "Synchronous callback from database facilitated by database driver"; IP.com, No. IPCOM000181684D; pp. 1-2; Apr. 9, 2009.

* cited by examiner

*Primary Examiner* — Robert Wilson
(74) *Attorney, Agent, or Firm* — North Shore Patents, P.C.; Michele Liu Baillie

(57) ABSTRACT

A method for sending information regarding an event in a critical table in a database. A receiver receives information regarding an event from a trigger corresponding to the event. The event may be one of an insert row, delete row or update row. Thereafter, a processor prepares one or more datagram packets containing the information regarding the event. Then, an event dispatcher sends the one or more datagram packets to a multicast group over a network. Finally, the multicast group forwards the datagram packets to a destination host device subscribed to the multicast group, without storing the datagram packets.

19 Claims, 5 Drawing Sheets

TRANSMITTING CRITICAL TABLE INFORMATION IN DATABASES

BACKGROUND

A database is a collection of information related to a subject, organized in a manner to facilitate storing and retrieving information in a scalable and robust fashion. Computerized databases are employed for storing information in many formats and providing that information to users and applications. For example, a database could contain information regarding clients and their recent purchases. The information regarding a particular client may be retrieved from database.

Computerized databases are implemented in processing systems which typically include a processor, a memory and input/output devices. The processor executes programs stored in memory, and the programs communicate with the environment using the input/output devices. The computerized databases include tools for data insertion, deletion, modification and retrieval. Programs stored in the memory can employ these tools to perform tasks on the databases, with individual tasks referred to as database events. As an example, a program in C or Java could retrieve data from a database, perform some calculations, and store the result back into the database.

Numerous users or applications may be simultaneously performing operations on a particular database. Some of the users or applications may need information about database events as they occur. For example, an application may include a facility for sending a message about packaging and shipping a product. Before sending that message, the application needs to know when payment has been received, which is an item of information stored by the database. Database triggers may be used to write the payment information to history tables, and then these tables may be polled to obtain a list of changes in the database. A database trigger is code that is automatically executed in response to certain events on a particular table in a database.

In certain situations, users and applications located remotely from the database require information regarding events in critical tables in the database. Triggers may be used to send messages using platform-specific messaging systems, like Java Messaging System (JMS), to queues which are subscribed by consuming systems, but only those systems capable of employing such messaging systems can send and receive information regarding database events. In this example, only Java programs can send or receive JMS messages.

SUMMARY

Embodiments of the invention are directed to methods and systems for sending or transmitting information regarding an event in a database over a network.

In an embodiment, information regarding an event is received from a trigger corresponding to the event in a critical table in the database. The event may be one of an insert row, a delete row or an update row. Thereafter, data (also referred to as datagram) packets containing the information regarding the event are prepared. The datagram packets are then sent to a multicast group over a network. Finally, the datagram packets are forwarded to a destination host device subscribed to the multicast group. The multicast group does not store the datagram packets, and hence the system remains stateless at all times.

In a further embodiment, a client program modifies a critical table in a database. The modification corresponds to inserting a row, deleting a row or updating a row in the critical table. The database then fires triggers corresponding to the modification. The triggers invoke a user defined function (UDF) and pass information regarding the event to the UDF. The information includes database table name, primary key of the database table, the event type (insert row, update row or delete row) and change in value of data in the database table.

The UDF invokes an event dispatcher. Datagram packets containing information regarding the event are prepared. Since, the datagram packets are low-level packets, any program, process or system can receive and process the datagram packets, after performing minimal changes, like deploying a program to receive the datagram packets. The event dispatcher posts the datagram packets to a network backbone. A multicast group receives the datagram packets and forwards them to a destination host device subscribed to the multicast group. Event receiver in the destination host device receives the datagram packets. Thereafter, appropriate action is taken based on information in the datagram packets.

In a yet further embodiment, a receiver receives information regarding an event from a trigger corresponding to the event in a critical table in a database. The event is one of an insert row event, a delete row event or an update row event. Then, a processor prepares one or more datagram packets containing information regarding the event which includes one or more of a database table name, a primary key value, type of event and change in value of data in the database table, wherein the type of event is one of an insert row, a delete row or an update row. Thereafter, an event dispatcher sends the datagram packets to a multicast group over a network. Next, a multicast group module forwards the datagram packets to a destination host device subscribed to the multicast group, wherein the datagram packets are not stored by the multicast group. Finally, an event receiver receives the datagram packets at the destination host device.

DETAILED DESCRIPTION

The following detailed description is made with reference to the figures. Preferred embodiments are described to illustrate the present inventions not to limit its scope, which is defined by the claims. Those of ordinary skill in the art will recognize a variety of equivalent variations on the description that follows.

Figure 1:
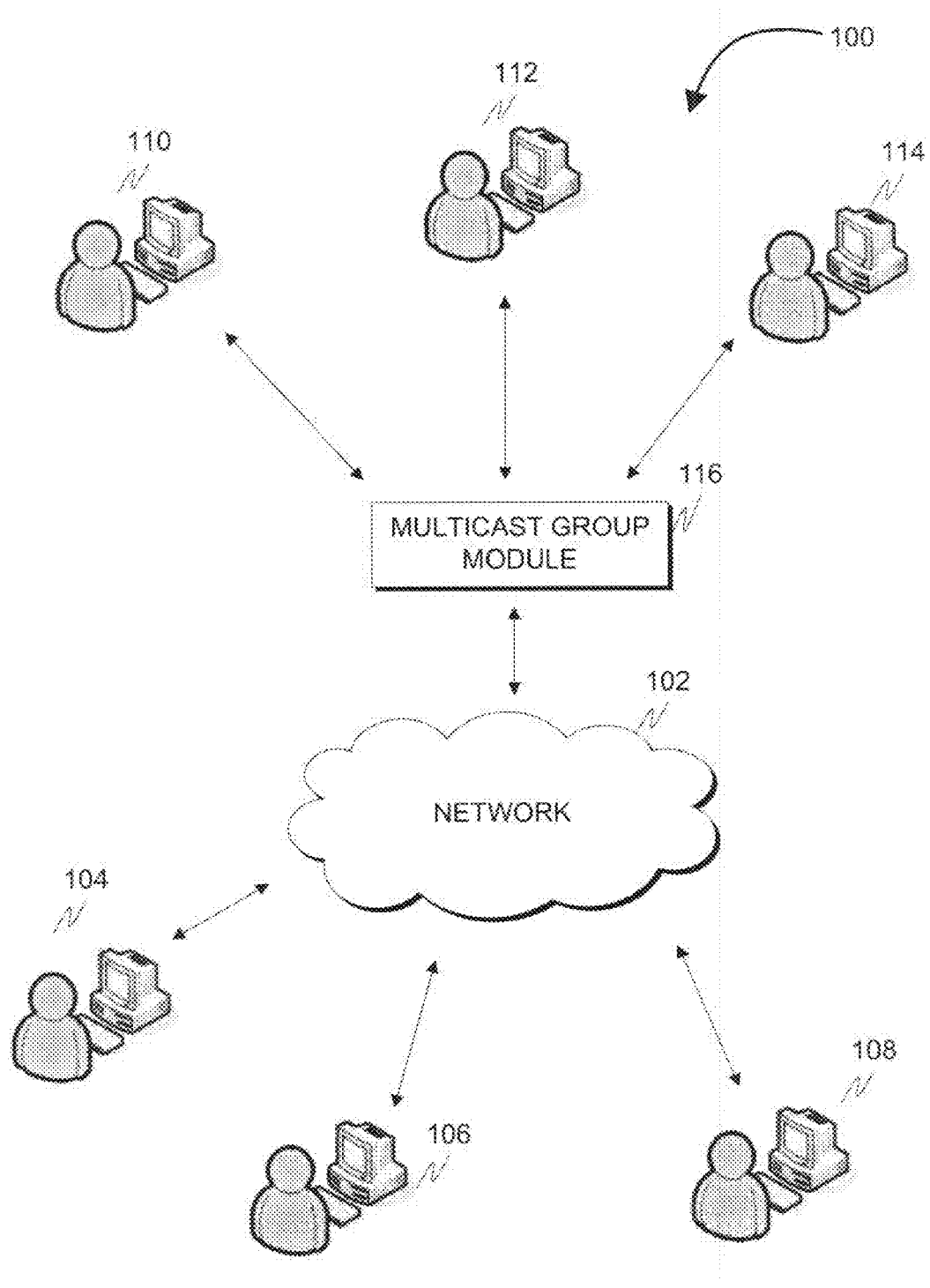
FIG. 1 is a block diagram illustrating an embodiment of an environment in which the invention may operate.

Referring now to the drawings, and in particular FIG. 1, a block diagram illustrates an embodiment of an environment 100 in which the invention may operate. The environment 100 includes a network 102, computing machines 104, 106, 108, 110, 112, 114, and a multicast group module 116. The network 102 can be implemented using any of the various technology solutions available in the art, such as Public Switched Telephone Network (PSTN), a computer network (for example, the Internet, Local Area Network (LAN), Metropolitan Area Network (MAN)), a wireless network (for example, Wireless Fidelity (Wi-Fi), Worldwide Interoperability for Microwave Access (WiMAX), Global System for Mobile Communications (GSM), Personal Communications Service (PCS) and Digital Advanced Mobile Phone Service (D-AMPS)). It should be noted that the type of network will be chosen by those in the art based on specific needs of database or communication application being used.

The computing machines 104, 106, 108, 110, 112, and 114 include but are not limited to any type of computer system based on a microprocessor, a mainframe computer, a personal computer, a portable computing device, or a device controller. The multicast group module 116 receives information from sources and forwards the information to the destinations. Therefore, the computing machines 104, 106, 108 act as sources to the multicast group module 116, as they send information to the multicast group module 116, whereas, the computing machines 110, 112, 114 act as destinations to the multicast group module 116 as they receive the information from the multicast group module 116. List of subscribers of the multicast group module 116 may be stored in multicast routers in the network 102. The multicast routers learn about multicast groups, which have members on networks attached to them using protocols such as Internet Group Management Protocol (IGMP).

The multicast group module 116 has an associated multicast address, which may be an IP multicast address. The computing machines 104, 106, 108 send information to the IP multicast address using an IP multicast protocol; examples of such protocols are Internet Group Management Protocol (IGMP), Protocol Independent Multicast (PIM), Distance Vector Multicast Routing Protocol (DVMRP), Multicast Open Shortest Path First (MOSPF), Multicast BGP (MBGP), Multicast Source Discovery Protocol (MSDP), Multicast Listener Discovery (MLD), GARP Multicast Registration Protocol (GMRP), and Multicast DNS (mDNS). IP Multicast addresses are placed in a class 'D' of IP addresses, which occupies an address space ranging from 224.0.0.0 to 239.255.255.255.

Figure 2:
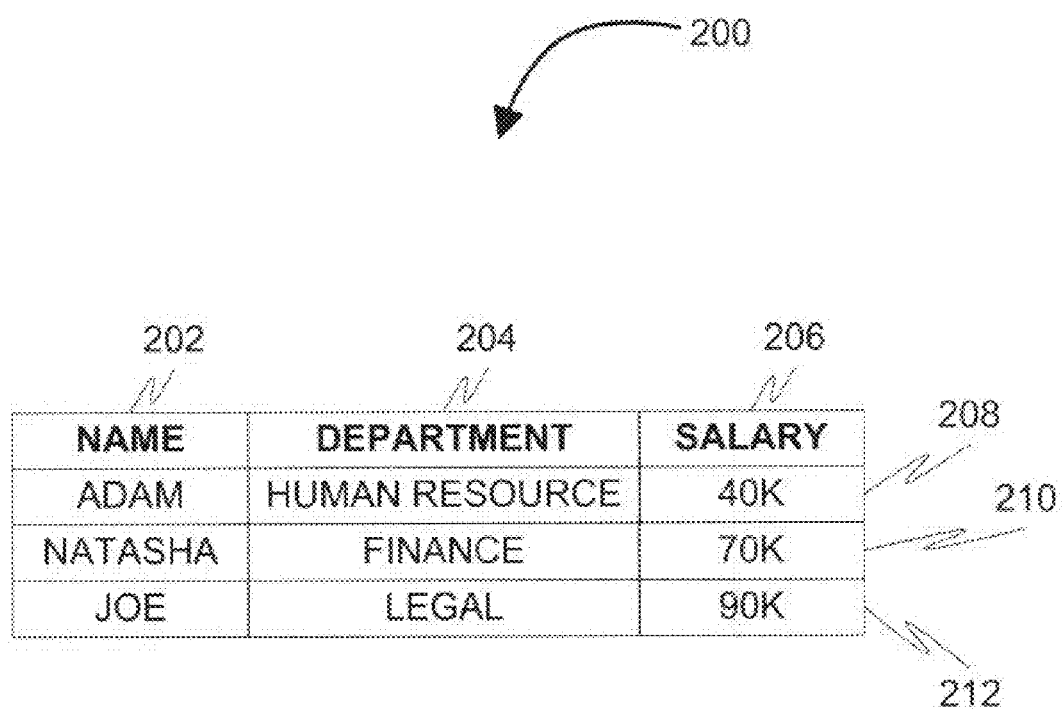
FIG. 2 illustrates a critical table in a database in an embodiment of the invention.

The computing machines 104, 106, 108 include relational databases. In a relational database, data is grouped using common attributes found in the data set. For example, a data set containing all customers of a hardware store may be grouped by the date the customer last visited the store; or it can be grouped by the price of the goods bought by the customer; or it can be grouped by the customers' last name. A relational database consists of a collection of relations (also known as tables); each database table is a set of data elements (values) that is organized using a model of vertical columns (which are identified by their name) and horizontal rows. FIG. 2 illustrates a database table. A database table has a specified number of columns, but can have any number of rows. Each row is identified by values appearing in a particular column subset, which has been identified as a candidate key. Further, each database may include one or more critical tables. In an embodiment, the one or more critical tables are identified based on business design. For example, in a medical decision support system a laboratory technician may update a central database with results of medical tests performed on a patient. Some of the tables in the central database may be marked critical as they correspond to important parameters. In a further embodiment, the one or more critical tables are identified based on technical design of a system employing the claimed invention.

FIG. 2 illustrates a critical table 200 in a database in an embodiment of the invention. The critical table 200 is included in a database in the computing machine 104. The critical table 200 includes three columns 202, 204 and 206 corresponding to fields—Name, Department and Salary. Further, the critical table 200 includes three data records in rows 208, 210 and 212. A database event corresponds to an operation performed on the data in a row, typically an insertion, a deletion or an update. An insert row event, for example, could occur when a new employee joins the company, so that a new record containing data about the new employee is added to the critical table 200. A delete row event, similarly, could occur when an employee leaves the company, and the corresponding employee record is removed from the critical table 200. Any change to existing data produces an update row event, such as the data change required when an employee's pay is increased.

Figure 3:
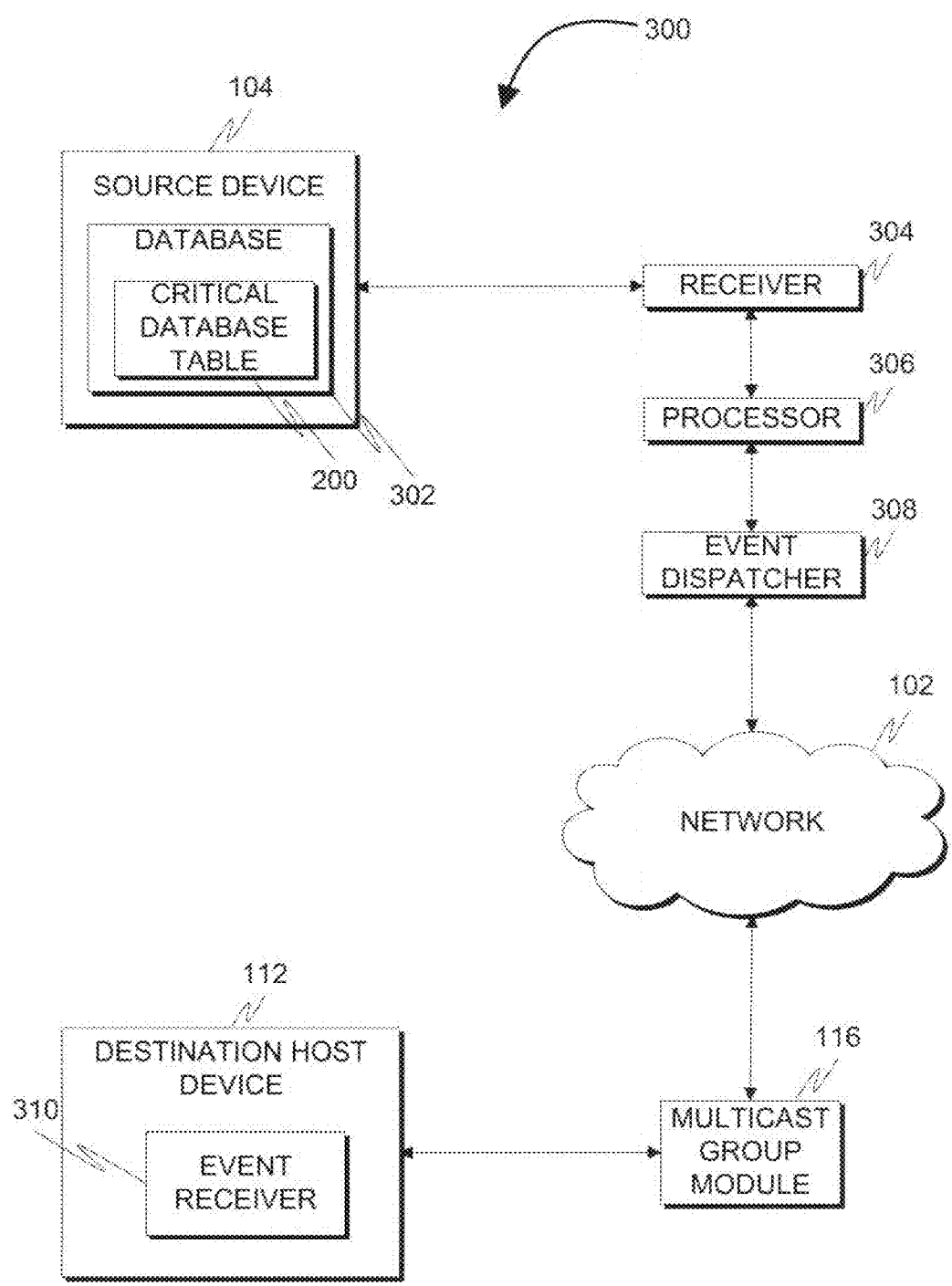
FIG. 3 is a block diagram illustrating sending information regarding an event in a critical table in a database in an embodiment of the invention.

FIG. 3 is a system 300 including the network 102, the computing machine 104, and the computing machine 112. In the following discussion, the computing machine 104 is referred to as the source device 104 and the computing machine 112 is referred to as the destination host device 112. In an embodiment, various components of system 300 interact to enable sending information regarding an event in the critical table 200 over the network 102. The source device 104 includes a database 302 which includes the critical table 200. The system 300 further includes a receiver 304, a processor 306, an event dispatcher 308, the destination host 112, and the multicast group module 116. The destination host 112 includes an event receiver 310.

The receiver 304 can be a software implemented module. The receiver 304 is capable of receiving information regarding the event from a trigger corresponding to the event from the database 302. The processor 306 can be a general purpose processor used in modern day computing devices. The processor 306 is capable of receiving information regarding the event from the receiver 304 and preparing datagram packets containing the information. The information includes various parameters associated with the critical table 200 including, but not limited to, a database table name, a primary key value, type of event and change in value of data in the critical table 200.

Figure 5:
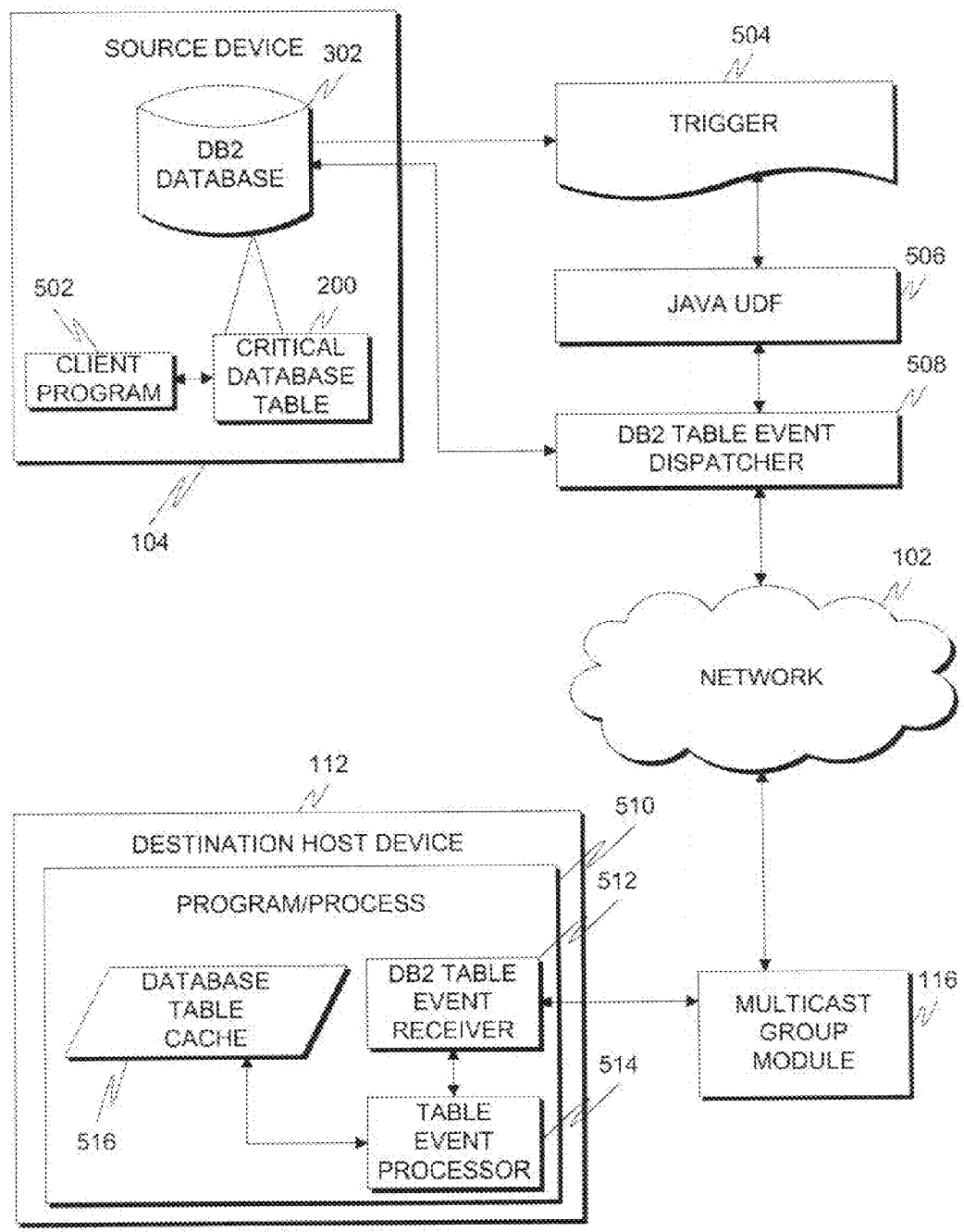
FIG. 5 is a block diagram illustrating a detailed implementation of a method for sending information regarding an event in a critical table in a database in an exemplary embodiment of the invention.

The event dispatcher 308 can be a software based module that is capable of sending the datagram packets to the multicast group module 116 over the network 102 over low-level network sockets. The event dispatcher 308 may be created using multicast libraries in Java. The creation of the event dispatcher 308 is explained in detail in conjunction with FIG. 5 given below. The multicast group module 116 forwards the datagram packets to the destination host device 112 subscribed to the multicast group, without storing the datagram packets. The receiver 304, the processor 306 and the event dispatcher may be included in the source device 104 or a router in the network 102.

The event receiver 310, which can be a software based module, is capable of receiving the datagram packets sent by the multicast group module 116 at the destination host device 112. The event receiver 310 may be created using multicast libraries in Java. The event receiver 310 is included in the applications or processes that are interested in receiving the datagram packets. The inclusion of event receiver 310 in the interested applications or processes is explained in detail in conjunction with FIG. 5 given below.

Figure 4:
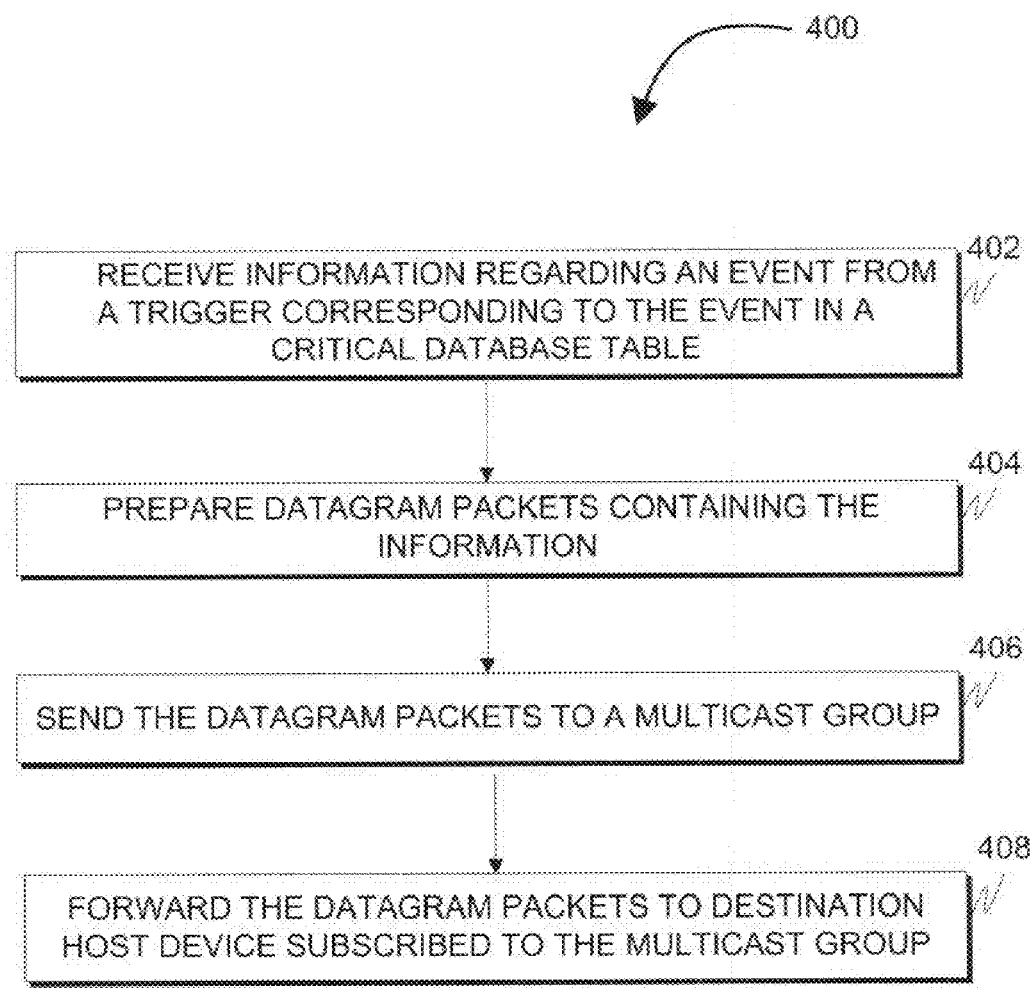
FIG. 4 is a flowchart of a method for sending information regarding an event in a critical table in a database in an embodiment of the invention.

FIG. 4 is a flowchart of a method 400 for sending information regarding an event in the critical table 200 in an embodiment of the invention. At step 402, information regarding the event is received by the receiver 304 from a trigger corresponding to the event. Then at step 404, the processor 306 prepares datagram packets containing the information regarding the event, wherein the information includes a database table name, a primary key value, type of event and change in value of data in the database table. The type of event is one of insert row, delete row or update row. The datagram packets are low level data packets. In an embodiment, the processor 306 obtains an event XML message template string corresponding to the event and then creates the datagram packets using the event XML message template string. The event XML message template string is generated by replacing placeholders in a template with the information regarding the event. Table 1 below contains an example XML message template string.

TABLE 1

```
<?xml version="1.0" encoding="UTF-8"?>
<eventData>
    <tableName>{0}</tableName>
        <keyValue>{1}</keyValue>
        <changeType>{2}</changeType>
    <eventTime>{3}</eventTime>
</eventData>
```

{0}, {1}, {2}, and {3} in the XML message template string in table 1 are placeholders that may be replaced with the information regarding the event.

In an embodiment, the processor 306 calls a user defined function (UDF) and passes the information regarding the event to the UDF. The UDF invokes the event dispatcher 308 to send the datagram packets as explained in detail in conjunction with FIG. 5 given below. A UDF may further carry certain properties; for example, the Sequential Query Language (SQL) standard defines the following properties for a UDF:

Language—Defines the programming language in which the user-defined function is implemented (examples are SQL, C, or Java).

Parameter style—Defines the conventions that are used to pass the function parameters and results between the implementation of the function and the database system.

Specific name—A name for the function that is unique within the database.

Determinism—Specifies whether the function is deterministic or not.

SQL-data access—Tells the database management system whether the function contains no SQL statements (NO SQL), contains SQL statements but does not access any tables or views (CONTAINS SQL), reads data from tables or views (READS SQL DATA), or actually modifies data in the database (MODIFIES SQL DATA).

Next, the event dispatcher 308 sends the datagram packets to the multicast group module 116 at step 406. The event dispatcher 308 may create a socket for sending the datagram packets over the network 102. The socket acts as an end-point of a bidirectional process-to-process communication flow across an IP based network, such as the Internet. The socket is a datagram socket which is a sending or receiving point for packet delivery services. Each packet sent or received on a datagram socket is individually addressed and routed.

At step 408, the multicast group module 116 forwards the datagram packets to the destination host device 112 subscribed to the multicast group without storing the datagram packets. The forwarding includes pushing the datagram packets to the destination host devices 110, 112, 114 subscribed to the multicast group immediately after receiving the datagram packets. Therefore, the datagram packets are delivered without any delay and the system remains stateless at all points of time. The multicast group may be a broadcast group.

In an example scenario, a financial system can employ the method 400 to reduce credit card deactivation time, when the deactivation is initiated outside the realms of the transaction management system in the financial system. The transaction management system is implemented in the destination host device 112 which is subscribed to the multicast group module 116. The credit card deactivation is initiated in the source device 104 by updating the corresponding data in the database 302 in the source device 104. A trigger is fired by the database 302 corresponding to the update event. The receiver 304 receives information regarding the update event from the trigger corresponding to the update event. Thereafter, datagram packets containing the information about the update event are prepared by the processor 306. The event dispatcher 308 then sends the datagram packets over the network 102 to the multicast group module 116. The multicast group module 116 forwards the datagram packets to the destination host device 112 subscribed to the multicast group. An event receiver in the destination host device 112 receives the datagram packets. The transaction management system then performs necessary actions based on the information received. Similarly, a retailing system can employ the method 400 to ensure that Point of Sales (POS) system blocks selling contaminated or re-called items, when the status update of such items is made by a system outside realms of the POS solution. Further, a retailing system can employ the method 400 to implement emergency price corrections when the price corrections are made by a system outside realms of the POS solution.

FIG. 5 is a block diagram illustrating a detailed implementation of a method for sending information regarding an event in the critical table 200 to perform synchronous cache invalidation in an exemplary embodiment of the invention. Synchronous cache invalidation is required when cache data source is changed outside the context of the caching solution. Further, embodiments of the invention may be employed in situations where it is required to synchronize an Enterprise JavaBeans™ (EJB) entity with a database, where one or more applications are using the database. EJB is a managed, server-side component architecture for modular construction of enterprise applications.

The source device 104 includes a client program 502, which modifies the critical table 200 in the database 302. In the embodiment of FIG. 5, the database 302 is a DB2 database. In the following discussion, the database 302 is referred to as the DB2 database 302. Triggers may be created on database tables in the DB2 database 302. Computer programs interact with databases by firing queries (the queries may be SQL queries) to perform certain tasks like insert a new row, delete an existing row or update an existing row in a database table in any database. The database fires triggers created for the database table corresponding to the modification made to the database table. The client program 502 may modify the critical table 200 by firing an SQL query to insert a new row, delete an existing row or update an existing row. The DB2 database 302 then fires a trigger 504 corresponding to modification made by the client program 502. The trigger 504 is one of an insert row trigger, an update row trigger and a delete trigger. Triggers are created on every critical table. When any insert, update or delete event occurs on a critical table the relevant trigger is fired by the DB2 database 302 immediately. Table 2 below includes code of an example insert trigger that may be created on a critical table in the DB2 database 302.

TABLE 2

```
/* use @ as statement terminator */
create trigger bheshwar.postinsertemp
after insert
on bheshwar.employee
referencing new as insertedrow
for each row mode db2sql
begin atomic
declare dispRet integer;
set dispRet=broadcastEvent(cast('bheshwar.employee' as
varchar(100)),CAST(insertedrow.empno as varchar(2000)),
ast('INSERT'as varchar(100)));
if dispRet <> 420 then signal sqlstate '80001' ('Change data broad cast
failed');
end if;
end@
```

In the table 2, an insert trigger "bheshwar.postinsertemp" is created on database table "bheshwar.employee". The insert trigger "bheshwar.postinsertemp" makes a call to a function call "broadcastEvent". This function is called by passing relevant parameters like database table name, primary key of the database table, the event type (insert, update or delete) and change in value of data in the database table. The broadcastEvent function is a Java UDF 506.

Table 3 below contains SQL code snippet to demonstrate a sample structure of the Java UDF 506.

TABLE 3

```
/* Create the Java UDF */
create function broadcastEvent(tableName varchar(100), keyChanged
varchar(2000), changeType varchar(100))
 returns integer
fenced
variant
no sql
external action
language java
parameter style java
external name 'EventSenderUDF!broadcastEvent'
```

The Java UDF 506 creates a conduit to make calls to a Java helper class required by the Java UDF 506 which in turn will invoke DB2 Event Dispatcher class with parameters that were received by the Java UDF 506. The DB2 Event Dispatcher class (sample structure shown in code snippet below) constitutes a DB2 Table Event Dispatcher 508.

Table 4 below contains Java code snippet to demonstrate a sample structure of the Java helper class.

TABLE 4

```
db2EventLogger : DB2TableEventLogger = new
DB2TableEventLogger("META-INF/logging.properties",
"com.ibm.db2events");
broadcastEvent(String, String, String)
```

This Java class on compilation will create an instance of the DB2 Table Event Dispatcher class and make a call to the dispatch.Message( ) method.

The DB2 Table Event Dispatcher 508 creates a socket for the multicast croup module 116 and posts datagram packets on network backbone. Therefore, the DB2 Table Event Dispatcher 508 generates one stream which is delivered to all destination host devices subscribed to the multicast group module 116. The DB2 Table Event Dispatcher 508 is implemented using multicast libraries (extendable libraries) in Java. The multicast libraries are registered with the DB2 database 302.

Two Java libraries are employed to dispatch the database events via multicasting. The two libraries include a library DB2TableEventIPMultiCastSender.jar and a library DB2TableEventLogger.jar. The library DB2TableEventIPMultiCastSender.jar contains two classes—DB2TableEventDispatcher and DB2TableEventConstants. DB2TableEventDispatcher class is employed for dispatching datagram packets corresponding to the events over IP multicast and the DB2TableEventConstants class is meant for constants. The DB2TableEventDispatcher class is supported by the DB2TableEventConstants class. Some static values in a message template are picked from the DB2TableEventConstants class. Table 5 below contains Java code snippet to demonstrate a sample structure of the DB2TableEventDispatcher class.

TABLE 5

```
db2eventLogger: DB2TableEventLogger
multiCastGroup : InetAddress
-dispatchSocket : MulticastSocket
multiCastPort: int
socketLife : int
messageBuffSize: int
DB2TableEventDispatcher ( )
-loadProperties( )
-areProperitesValid( )
dispatchMessage( )
```

Table 6 below contains Java code snippet to demonstrate a sample structure of the DB2TableEventConstants class.

TABLE 6

```
OS_MIN_PORT : int
OS_MAX_PORT : int
MULTICAST_ADDRESS_PROP : String
MULTICAST_PORT_PROP : String
MULTICAST_SOCKET_TTL_PROP : String
MULTICAST_MESSAGE_BUFFSIZE : String
ROW_CHANGE_TYPE_ADD : String
ROW_CHANGE_TYPE_MODIFY : String
ROW_CHANGE_TYPE_DELETE : String
ROW_CHANGE_TYPE_INVALID : String
DISPATCH_SUCCESS : int
DISPATCH_FAILURE : int
MESSAGE_TEMPLATE : string
```

The library DB2TableEventLogger.jar contains a logger class to log errors, information, debug strings and other such information which is useful for debugging at a later point of time.

In an embodiment, the Java UDF 506 and the DB2 Table Event Dispatcher 508 are included in the source device 104. In a further embodiment, the Java UDF 506 is included in the receiver 304 and the DB2 Table Event Dispatcher 508 is included in the Event Dispatcher 308 in FIG. 3.

The multicast group module 116 receives the datagram packets from the DB2 Table Event Dispatcher 508 over the network 102. Thereafter, the multicast group module 116 forwards the datagram packets to the destination host device 112 subscribed to the multicast group. Since, the datagram packets are sent over a low-level layer like Network layer rather than high-level layer like RMI, any process (even non-Java processes) that includes a DB2 Table Event Receiver implementation is capable of receiving the datagram packets. A process 510 has a DB2 Table Event Receiver 512, which is implemented using multicast libraries in Java. In an embodiment, the DB2 Table Event Receiver 512 employs standards like IP Multicast and Mbone to receive the datagram packets. A Table Event Processor 514 obtains the datagram packets from the DB2 Table Event Receiver 512 and performs necessary functions based on information received. The Table Event Processor 514 performs cache invalidation on a Database Table Cache 516 by clearing the cache entry corresponding to the data modified in the DB2 database 302, where the Database Table Cache 516 is pre-loaded with data from the DB2 database 302.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for transmitting information relating to occurrence of an event in a critical table of a database, wherein the event is at least one of an insert row event, a delete row event or update row event, the method comprising:
    receiving information regarding the event from a trigger corresponding to the event in the database, wherein the information includes one or more of a database table name, a primary key value, type of event and change in value of data in the database table;
    preparing one or more data packets containing the information regarding the event;
    sending the one or more data packets to a multicast group over a network;
    forwarding the one or more data packets to a destination device subscribed to the multicast group without storing the one or more data packets by the multicast group; and
    receiving the one or more data packets at the destination host device.

2. The method of claim 1, wherein the preparing of the one or more data packets containing the information regarding the event further comprises:
    obtaining an event XML message template string corresponding to the event; and
    creating the one or more data packets using the event XML message template string.

3. The method of claim 2, wherein the event XML message template string is generated by replacing placeholders in a template with the information regarding the event.

4. The method of claim 1, wherein the sending of the one or more data packets further comprises:
    creating a socket for sending the one or more data packets over the network.

5. The method of claim 1, wherein the one or more data packets is sent over low level network sockets.

6. The method of claim 1, wherein the forwarding of the one or more data packets includes pushing the one or more data packets to the destination device subscribed to the multicast group after receiving the one or more data packets at the multicast group.

7. The method of claim 1, wherein the multicast group is a broadcast group.

8. A method for transmitting information relating to occurrence of an event in a critical table of a database, the method comprising:
    preparing a data packet containing information regarding the event in the critical table of the database;
    transmitting the data packet to a multicast group over a network;
    forwarding the data packet to a destination device subscribed to the multicast group without storing the data packet by the multicast group;
    receiving information regarding the event from a trigger generated on occurrence of the event in the critical table of the database, wherein the receiving the information includes the trigger calling a user defined function (UDF) and passing the information regarding the event to the UDF, wherein the UDF invokes an event dispatcher to send the data packets.

9. The method of claim 8, wherein the event comprises at least one of an insert row event, a delete row event or an update row event in the critical table of the database.

10. The method of claim 8, wherein the critical table is selected based on a business design of an application using the database.

11. The method of claim 8, wherein the information regarding the event includes a database table name, a primary key value, type of event and change in value of data in the database table.

12. The method of claim 8, wherein the UDF is a Java UDF.

13. The method of claim 12, wherein UDF is configured to invoke a helper class by passing the information regarding the event to the helper class, to send/transmit the data packets.

14. A system for transmitting information regarding occurrence of an event in a critical table of a database, wherein the event is at least one of an insert row event, a delete row event or update row event, the system comprising:
    a source computing device configured to:
        receive information regarding the event from a trigger corresponding to the event in the database, wherein the information includes one or more of a database table name, a primary key value, type of event and change in value of data in the database table,
        prepare one or more data packets containing the information regarding the event, and
        send the one or more data packets to a multicast group over a network;
    one or more multicast routers configured to forward the one or more data packets to a destination host device subscribed to the multicast group without storing the one or more data packets by the multicast group; and
    a destination host computing device configured to receive the one or more data packets at the destination host device.

15. The system of claim 14, wherein the critical table in the database is selected based on business design of an application using the database.

16. The system of claim 14, wherein the event dispatcher is created using multicast libraries in Java.

17. The system of claim 14, wherein the event receiver is created using multicast libraries in Java.

18. The system of claim 14, wherein the event dispatcher sends the one or more data packets over low level network sockets.

19. A computer program product for transmitting information regarding occurrence of an event in a critical table of a database, wherein the event is at least one of an insert row event, a delete row event or update row event, the computer program product comprising:

a computer readable storage memory having computer readable program code embodied therewith, the computer readable program code configured to:

receive information regarding the event from a trigger corresponding to the event in the database, wherein the information includes one or more of a database table name, a primary key value, type of event and change in value of data in the database table;

prepare one or more data packets containing the information regarding the event;

send the one or more data packets to a multicast group over a network;

forward the one or more data packets to a destination host device subscribed to the multicast group without storing the one or more data packets by the multicast group; and receive the one or more data packets at the destination host device.

* * * * *